(12) United States Patent
Male et al.

(10) Patent No.: US 6,199,767 B1
(45) Date of Patent: Mar. 13, 2001

(54) SPRING ASSEMBLY

(75) Inventors: Andrew Male, Crawley; Anthony Thomas Harcombe, Richmond, both of (GB)

(73) Assignee: Lucas Industries public limited company (GB)

( * ) Notice: Subject to any disclaimer, the term of this patent is extended or adjusted under 35 U.S.C. 154(b) by 0 days.

(21) Appl. No.: 09/207,186

(22) Filed: Dec. 8, 1998

(30) Foreign Application Priority Data

Jan. 31, 1998 (GB) .................................................. 9802061

(51) Int. Cl.[7] ...................................................... F02D 1/06
(52) U.S. Cl. ........................ 239/5; 239/533.2; 239/533.9; 239/585.1
(58) Field of Search ........................ 239/5, 533.2–533.12, 239/585.1–585.5; 267/166, 170, 167

(56) References Cited

U.S. PATENT DOCUMENTS

| 3,032,279 | * | 5/1962 | Czarnecki ........................... 239/533.2 |
| 3,613,520 | * | 10/1971 | Worden ................................. 267/175 |
| 4,280,659 | * | 7/1981 | Gaal et al. ......................... 239/533.9 |
| 4,394,972 | * | 7/1983 | Potter ................................. 239/533.12 |
| 4,575,008 | * | 3/1986 | Kaczynski .......................... 239/533.3 |
| 4,730,785 | * | 3/1988 | Seifert ................................. 239/533.3 |
| 4,993,376 | * | 2/1991 | Fukutome et al. .................... 267/170 |
| 5,040,727 | * | 8/1991 | Muntean et al. .................. 239/533.9 |
| 5,110,053 | * | 5/1992 | Stevens ............................. 239/533.9 |
| 5,125,580 | * | 6/1992 | Kronberger ........................ 239/533.8 |
| 5,335,861 | * | 8/1994 | Matsusaka ......................... 239/533.8 |
| 5,860,365 | * | 1/1999 | Lhotak ................................. 267/71 |
| 6,036,120 | * | 3/2000 | Varble et al. ...................... 239/585.5 |

FOREIGN PATENT DOCUMENTS

| 3941151 | * | 6/1991 | (DE) ................................. 239/533.12 |
| 2104957 | * | 3/1983 | (GB) ................................. 239/533.2 |

* cited by examiner

Primary Examiner—Patrick Brinson
Assistant Examiner—Dinh Q. Nguyen
(74) Attorney, Agent, or Firm—Trexler, Bushnell, Giangiorgi, Blackstone & Marr, Ltd.

(57) ABSTRACT

A spring assembly comprises a helical compression spring engaged between first and second spring abutments and a collar limiting movement of the second spring abutment away from the first spring abutment.

15 Claims, 2 Drawing Sheets

SPRING ASSEMBLY

This invention relates to a spring assembly, and in particular to a spring assembly suitable for use in a valve controlling the operation of a fuel injector.

In a fuel injector, it is known to use the fuel pressure within a control chamber to control the position of a valve needle of the injector, and hence control injection. It is usual to control the fuel pressure within the control chamber using an electromagnetically actuated valve, the electromagnetic actuator of which acts against a spring. It will be appreciated that in order to permit accurate control over injection, the preload of the spring must fall within a predetermined, relatively narrow range.

During assembly of such an injector, the various loose components including the spring are located within the injector body, and it will be appreciated that, in order to achieve the desired preload of the spring, the dimensions of each component must be measured prior to assembly and appropriate shims introduced. An object of the invention is to provide a spring assembly whereby the preload of the spring can be set prior to assembly of the injector.

According to the present invention there is provided a spring assembly comprising a helical compression spring engaged between first and second spring abutments, and a collar secured to the first spring abutment limiting movement of the second spring abutment away from the first spring abutment under the action of the spring.

The first spring abutment is conveniently defined by an end wall of a tubular spring housing.

The collar is conveniently secured to the spring housing by welding.

In such a spring assembly, the spring can be compressed to the desired preload prior to securing the collar to the housing. After the collar is secured in position, the assembly can be introduced into an injector, and as the spring preload has already been set, measurement of the dimensions of the components can be avoided.

The invention also relates to a control valve incorporating such a spring assembly, and to an injector incorporating such a control valve.

According to another aspect of the invention there is provided a method of assembling a spring assembly comprising engaging a spring between first and second spring abutments, compressing the spring until a desired spring preload is achieved, and securing a collar to the first spring abutment to limit movement of the second spring abutment away from the first spring abutment under the action of the spring.

The invention will further be described, by way of example, with reference to the accompanying drawings, in which.

Figure 1:
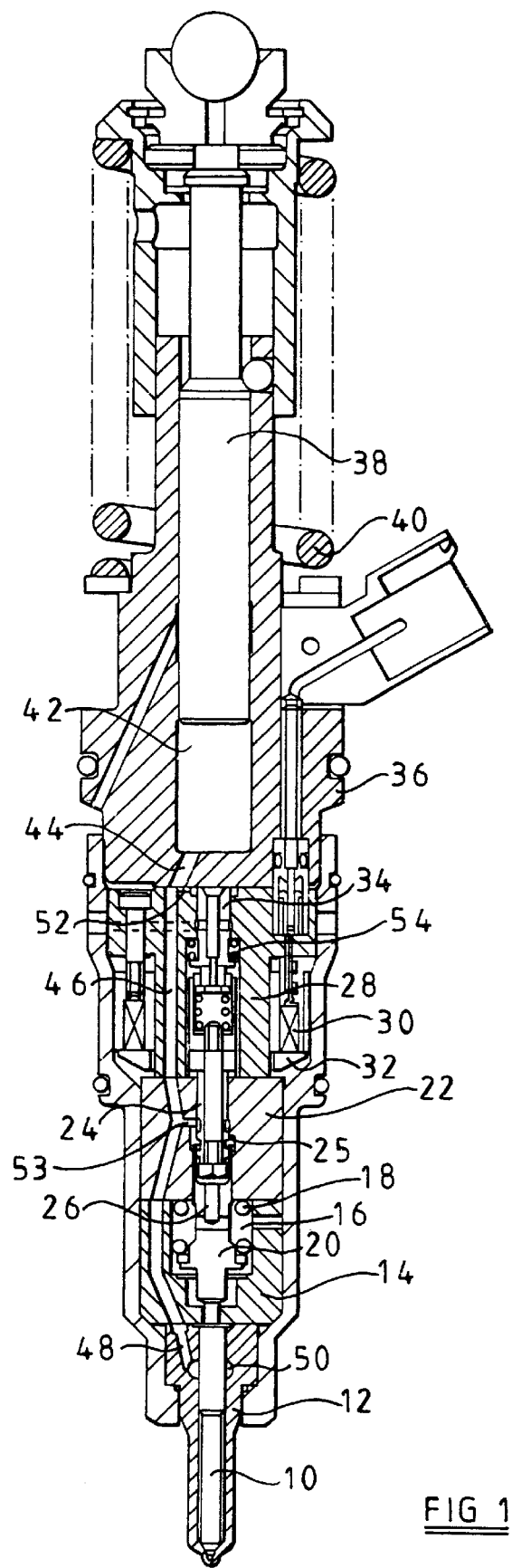
FIG. 1 is a cross-sectional view of a fuel injector incorporating a spring assembly in accordance with an embodiment of the invention.

The pump injector illustrated in FIG. 1 comprises a valve needle 10 which is reciprocable within a blind bore formed in a nozzle body 12. The blind end of the bore defines a seating with which an end of the valve needle 10 is engageable to control the flow of fuel through the bore to one or more outlet openings provided in the nozzle body 12.

The nozzle body 12 engages a first distance piece 14 which is provided with a through bore defining a spring chamber 16. The spring chamber 16 houses a spring 18 which engages a spring abutment member 20 to bias the valve needle 10 towards the seating.

The end of the first distance piece 14 remote from the nozzle body 12 engages a second distance piece 22 which includes a through bore into which an upper part of the abutment member 20 extends. The upper part of the spring abutment member 20 and the bore together define a control chamber 25. It will be appreciated that the fuel pressure within the control chamber 25 acts on the spring abutment member 20 to urge the valve needle 10 towards the seating. The bore is shaped to define a seating with which a control valve member 24 is engageable to control the flow of fuel towards the control chamber 25. A lower end region of the control valve member 24 is received within a recess formed in the upper part of the abutment member 20. A small clearance is provided between the control valve member 24 and abutment member 20, the abutment member 20 being provided with passages 26 which communicate with the spring chamber 16. It will be appreciated that the small clearance together with the passages 26 permit fuel to escape from the control chamber 25 at a controlled rate.

Abutting the upper end of the second distance piece 22 is an actuator housing 28 carrying a winding 30, an armature 32 which is secured to the upper end of the control valve member 24 being moveable under the influence of the magnetic field generated, in use, by the winding. Also located within the actuator housing 28 is a drain valve member 34 which is engageable with a lower end of a pump housing 36 which engages the upper end surface of the actuator housing 28.

The pump housing 36 is provided with a bore 42 within which a pumping plunger 38 is reciprocable under the influence of a cam arrangement (not shown) and a return spring 40. The bore 42 communicates through a passage 44 with a delivery passage 46 defined by drillings which extend through the actuator housing 28, and first and second distance pieces 14, 22 and a drilling 48 is provided in the nozzle body 12 to provide communication between the delivery passage 46 and an annular gallery 50 surrounding the valve needle 10. A groove 52 provided in the upper surface of the actuator housing 28 provides a flow path between the delivery passage 46 and a chamber within which the end of the drain valve member 34 is located. A passage 53 provides a flow path between the delivery passage 46 and a part of the bore of the second distance piece 22 upstream of the control valve seating.

As illustrated in FIG. 1, the drain valve member 34 is of tubular form, and is arranged such that when the drain valve member 34 engages the pump housing 36, flow of fuel between the bore 42 and a low pressure drain reservoir is not permitted, movement of the drain valve member 34 away from the pump housing 36 permitting fuel to flow to or from the low pressure fuel reservoir.

Figure 2:
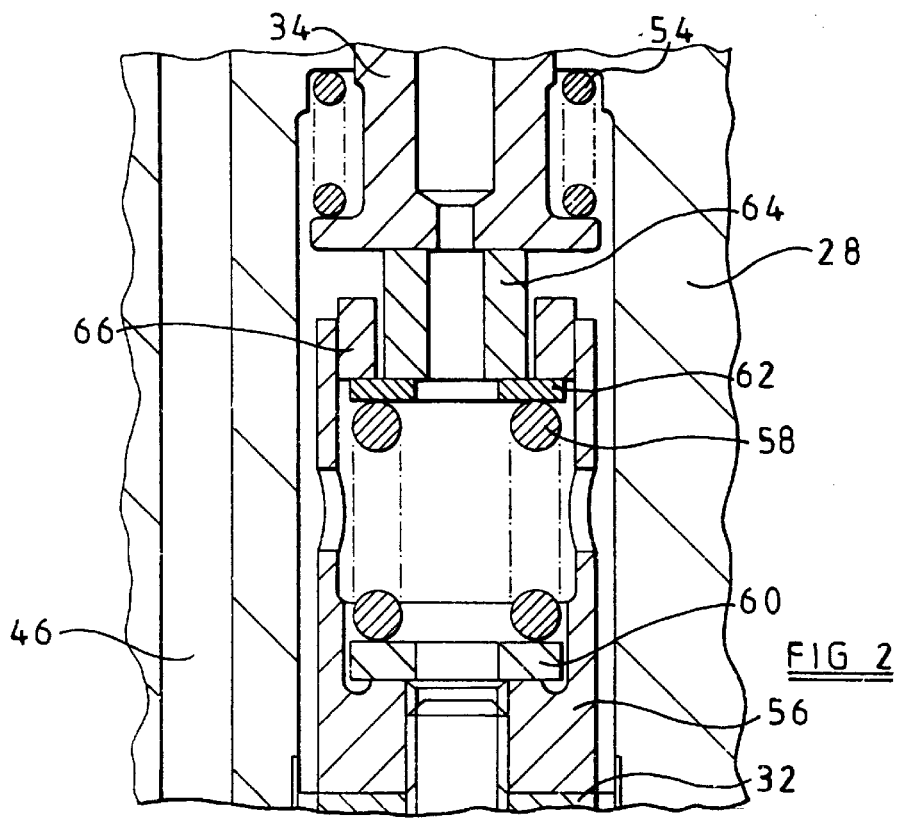
FIG. 2 is an enlargement of part of FIG. 1.
Figure 3:
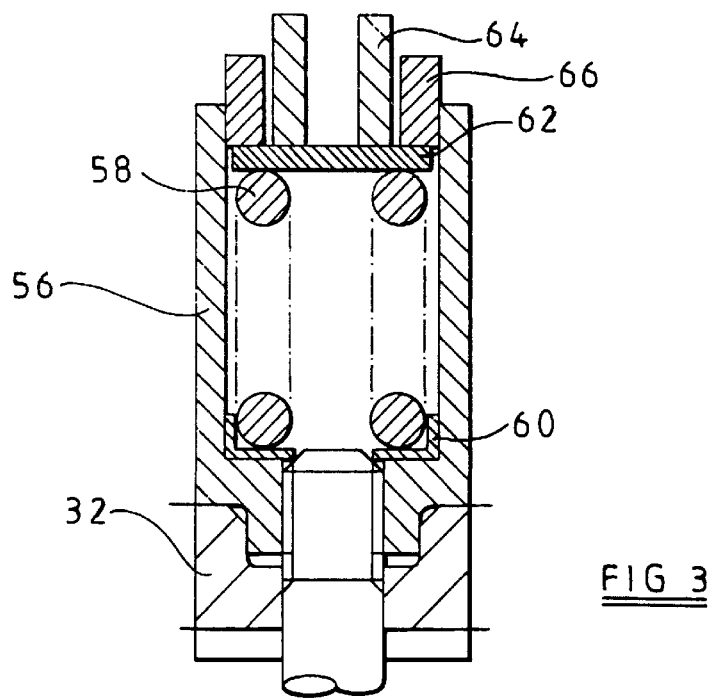
FIG. 3 is a diagrammatic view illustrating the spring assembly of FIG. 1.

The drain valve member 34 is biased by means of a spring 54 away from the pump housing 36. Further, a spring arrangement is provided between the drain valve member 34 and the armature 32, the spring assembly being illustrated in greater detail in FIGS. 2 and 3. The spring assembly comprises a generally tubular spring housing 56 which includes a lower, integral end wall forming a first spring abutment, a screw-threaded bore being provided in the end wall. A shaft which connects the control valve member 24 to the armature 32 is in screw-threaded engagement within the screw-threaded bore of the spring housing 56 to secure the spring housing 56 to the armature and control valve member 24.

A helical compression spring 58 is located within the spring housing 56, a spring seat 60 being engaged between the spring 58 and spring housing 56. The end of the spring 58 remote from the spring seat 60 engages a second spring abutment defined by a spring abutment plate 62 which engages a spacer tube 64, the spacer tube 64 in turn engaging the drain valve member 34. A collar 66 is secured within the upper end of the spring housing 56, the collar 66 limiting movement of the spring abutment plate 62.

In use, with the actuator de-energized, the drain valve member 34 and control valve member 24 are both spaced from their respective seatings due to the action of the spring 54 and spring 58 of the spring assembly. In this position, if the pumping plunger 38 is moved outwardly under the action of the spring 40, then fuel is drawn past the drain valve member 34 and through the passage 44 to the bore 42. At this time in the operation of the injector, the valve needle 10 is held in engagement with its seating by the spring 18.

Eventually, the pumping plunger 38 reaches its outermost position, and commences inward movement under the action of the cam arrangement. Such inward movement displaces fuel from the bore 42 past the drain valve member 34 to the low pressure drain. When it is desired to commence pressurization of fuel, the actuator is energized to a first, relatively low level, lifting the armature 32 by a first distance. The movement of the armature 32 is transmitted through the spring 58 of the spring assembly to the spring abutment plate 62, spacer tube 64 and drain valve member 34, moving the drain valve member 34 against the action of the spring 54 into engagement with the pump housing 36. The movement of the drain valve member 34 terminates the flow of fuel to the low pressure drain, and continued inward movement of the pumping plunger 38 pressurizes the fuel within the bore 42.

At this stage in the operation of the pump injector, the control valve member 24 is still spaced from its seating, thus the pressure of fuel within the control chamber 25 is substantially equal to that within the bore 42 and that acting on the valve needle 10 urging the valve needle 10 away from its seating. It will be appreciated that as, at this stage in the operation of the injector, the valve needle 10 is substantially pressure balanced, the spring 18 maintains the valve needle 10 in engagement with its seating.

In order to commence injection, the actuator is energized to a greater level, causing further movement of the armature 32, such movement compressing the spring 58 of the spring assembly and moving the control valve member 24 into engagement with its seating. Such movement of the control valve member 24 terminates the supply of fuel to the control chamber 25, and as the control chamber 25 communicates with the low pressure drain through the clearance between the control valve member 24 and spring abutment member 20, the pressure acting on the spring abutment member 20 is reduced, and a point will be reached beyond which the fuel pressure acting on the valve needle 10 is sufficient to lift the valve needle 10 against the action of the spring 18, thus commencing injection.

When injection is to terminate, the actuator is de-energized thus increasing the pressure acting on the spring abutment member 20 to urge valve needle 10 into engagement with its seating, and lifting the drain valve member 34 away from the pump housing 36 thus permitting fuel to escape to the low pressure drain.

During assembly of the injector, the spring assembly is introduced into the actuator housing as a preassembled unit. The process for assembling the spring assembly includes the steps of locating the spring seat 60, spring 58 and spring abutment plate 62 within the tubular spring housing 56, applying a force to the spring abutment plate 62 to compress the spring 58 until the desired preload has been achieved, and then securing the collar 66 to the spring housing 56, thus limiting relaxation of the spring. The collar 66 is secured to the spring housing 56, for example, by welding or by providing a screw-thread on the collar 66 and a cooperating screwthread on the spring housing 56. However, it will be appreciated that other techniques for securing the collar 66 in position could be used. If desired, the step of applying a force to the spring abutment plate 62 to compress the spring 58 to the desired level can be achieved by applying a force to the collar 66 prior to securing the collar 66 in position, and if desired, separate means may be provided for holding the spring abutment plate 62 in the desired preload position whilst the collar 66 is secured to the spring housing 56, for example inserting a pin through the screw-threaded opening in the spring housing 56 to trap the spring abutment plate 62 between the pin and the collar 66. Suitable welding techniques for securing the collar 66 to the spring housing 56 include laser or electron beam welding, but it will appreciated that any other technique with a relatively small heat affected zone may be used.

In a typical pump injector, the rate of the spring is approximately 200 N/mm, and the nominal preload falls within the range 120 to 150 N. The preload typically needs to be of accuracy greater than ±5 N, and this means that the collar must be positioned to an accuracy of, for example, ±15 $\mu$.

Although in the embodiments described hereinbefore, a spring seat is located between the spring 58 and spring housing 56, it will be appreciated that, if appropriate, the spring seat 60 may be omitted, or the shape or dimensions of the spring seat may be altered to suit the particular application.

Clearly, by assembling the spring assembly prior to inserting the spring assembly into the pump injector arrangement, the preload of the spring assembly can be tested prior to assembly of the injector, if desired, at a different location to the injector assembly location, and measurement of the injector component dimensions to permit the desired preload to be achieved can be avoided. Further, assembly of the injector is simplified as fewer loose components need to be positioned within the injector.

The use of the spring assembly has the further advantages that, in the rest position, as the spring abutment plate abuts the collar, the spring abutment plate is parallel to the armature. As a result, the required dimensions of the spacer tube can be determined relatively easily. Further, the length and diameter of the spring assembly is smaller than the space required to house the equivalent components in a conventional injector.

In a modification, the tubular spring housing is omitted, and instead the first spring abutment is defined by a plate to which an axially extending rod is secured, the rod extending along the axis of the spring. The collar is secured to the rod to limit movement of a second spring abutment from the first spring abutment.

What is claimed is:

1. A method of assembling a spring assembly to be housed within a housing comprising the steps of:
    engaging a spring between first and second abutments,
    compressing the spring until a desired spring pre-load is achieved,
    securing a collar to the first spring abutment to limit movement of the second spring abutment away from the first spring abutment under the action of the spring, and subsequently inserting the spring assembly, having the desired spring load, into the housing.

2. The method as claimed in claim 1, comprising the step of providing a tubular spring housing having an end wall which defines the first spring abutment.

3. The method as claimed in claim 2, comprising the step of welding the collar to the tubular spring housing.

4. The method as claimed in claim 1, whereby the step of compressing the spring until the desired pre-load is achieved by applying a force to the collar prior to securing the collar to the first spring abutment.

5. The method as claimed in claim 4, comprising the further step of providing an arrangement for holding the second spring abutment in a position in which the desired preload is achieved whilpre-loadcollar is secured to the first spring abutment.

6. A method of assembling a control valve comprising a valve member, the method comprising the steps of;

assembling the spring assembly using the method as claimed in claim 1, securing the valve member to the first spring abutment, and providing an actuator which is operable, in use, to move the valve member against the action of the spring of the spring assembly.

7. The method as claimed in claim 6, comprising the step of providing a tubular spring housing having an end wall which defines the first spring abutment forming part of the spring assembly.

8. The method as claimed in claim 7, comprising the step of welding the collar forming part of the spring assembly to the tubular spring housing.

9. The method as claimed in claim 6, whereby the step of compressing the spring until the desired pre-load is achieved by applying a force to the collar prior to securing the collar to the first spring abutment.

10. The method as claimed in claim 9, comprising the further step of providing an arrangement for holding the second spring abutment in a position in which the desired preload is achieved whilpre-loadcollar is secured to the first spring abutment.

11. A method of assembling a fuel injector comprising an injector housing comprising the steps of;

providing a valve needle which is moveable under the influence of the fuel pressure within a control chamber, providing a control valve controlling the fuel pressure within the control chamber, assembling the spring assembly using the method as claimed in claim 1 prior to inserting the spring assembly into the injector housing, whereby the control valve comprises an actuator which is operable to move the valve member against the action of the spring forming part of the spring assembly, in use.

12. The method as claimed in claim 11, comprising the step of providing a tubular spring housing having an end wall which defines the first spring abutment forming part of the spring assembly.

13. The method as claimed in claim 12, comprising the step of welding the collar forming part of the spring assembly to the tubular spring housing.

14. The method as claimed in claim 11, whereby the step of compressing the spring until the desired pre-load is achieved by applying a force to the collar prior to securing the collar to the first spring abutment.

15. The method as claimed in claim 14, comprising the further step of providing an arrangement for holding the second spring abutment in a position in which the desired prelpre-loadachieved whilst the collar is secured to the first spring abutment.

* * * * *